Figures 1, 2:
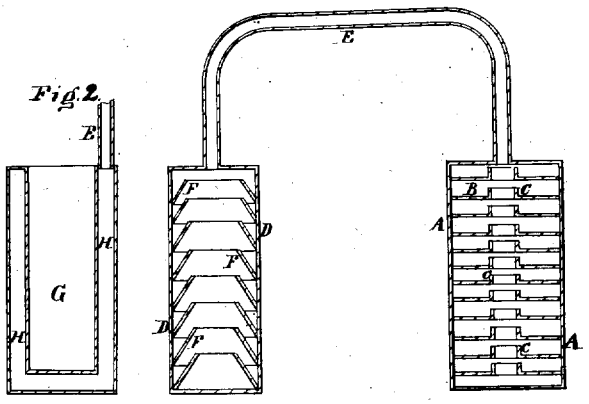

F. P. E. CARRE.

Manufacture of Ice.

No. 5,288. Reissued Feb. 18, 1873.

Witnesses,
George E. Buckley
George R. Patterson

Inventors, Ferdinand Philippe Jonas Carré
Jean Baptiste Jean Mignon
Henri Stanislas Rouart per Geo. H. Harding Atty.

UNITED STATES PATENT OFFICE.

FERDINAND PHILIPPE EDOUARD CARRÉ, OF ST. PIERRE LES NEMOURS, ASSIGNOR OF PART INTEREST TO JEAN B. J. MIGNON AND HENRI S. ROUART, OF PARIS, FRANCE.

IMPROVEMENT IN THE MANUFACTURE OF ICE.

Specification forming part of Letters Patent No. 30,201, dated October 2, 1860; reissue No. 5,288, dated February 18, 1873.

DIVISION B.

*To all whom it may concern:*

Be it known that FERDINAND PHILIPPE EDOUARD CARRÉ, of St. Pierre les Nemours, (Seine-et-Marne,) France, did invent a certain new and Improved Process for the Artificial Production of Ice and Cold; and that the following is a full, clear, and exact description of the same, reference being had to the annexed drawing making part hereof, in which—

Figure 1 is a vertical cross-section of one form of the apparatus, in which the process may be worked; Fig. 2, a similar view of a freezing-chamber, which may be substituted for D of Fig. 1.

The nature of the invention is as follows: It makes use of the properties which certain substances (particularly water for gas of ammonia) possess, when exposed to cold, of absorbing considerable quantities of gases or vapors, and when heated yielding them again, especially in the vacuum, for the practical production of ice and cold. The absorbent is heated, driving off the gas or vapor, which, after leaving it, is liquefied by its own pressure, assisted by a liquid, applied exteriorly, to remove the latent heat. The heating is then stopped, and the pressure relieved; the liquefied gas immediately volatilizes, producing an intense cold, and passes back to the absorbent, to be driven off again. The volatilization of the liquefied gas is assisted by the cooling produced by the water which has been used to assist in the liquefaction of the gas, and which water is removed from around the chamber containing the liquefied gas to be applied around the recipient containing the absorbent. The liquid to be frozen is then placed either around the chamber D of Fig. 1, or in the interior chamber G of Fig. 2. A vacuum is formed as soon as the heating of the absorbent is stopped by the power of affinity possessed by the absorbent for the gas; the absorbent, as it cools, reabsorbs the volatilized gas, producing this vacuum.

To enable others skilled in the art to use the process, it is described more particularly as follows:

the recipient containing the absorbent. B are disks filling up the interior, each having an opening with flange C in the middle. D is the recipient into which the gases or vapors flow to be liquefied. E is a connecting-pipe. F are disks, each in the shape of the convex surface of the frustum of a cone, each fastened all around its lower edge to the inside of recipient D, having openings in the middle, thus forming shelves on the inside of this recipient D. G, Fig. 2, is an inner chamber, surrounded by an annular chamber, H, the latter connecting with pipe E when the recipient, Fig. 2, is substituted for recipient D, Fig. 1. The absorbent, for which water is preferred, is in recipient A on disks B, kept in place by flanges C. The absorbent contains gas—ammonia preferred. Recipient A is heated sufficiently to drive off the gas, but not enough to vaporize the absorbent itself; and this operation is facilitated by the number of shelves or disks B containing the absorbent, thus allowing it to be easily and quickly heated.

The gas, after separating from the absorbent, passes through the pipe E into the liquefying-chamber or recipient D, where, in consequence of the pressure of the incoming gas, and assisted by the water surrounding the recipient, which extracts from the gas its latent heat, it becomes liquefied and falls on shelves F; the heating of the recipient A is then stopped, thus relieving the pressure on the liquefied gas. The water which has been used to assist in the liquefaction of the gas is then removed, and the recipient A containing the absorbent is placed in it; this, coupled with the relief of the pressure, induces the volatilization of the liquefied gas. This volatilized gas now extracts the heat from whatever liquid surrounds recipient D, or is in chamber G, and freezes it.

Fig. 2 may be substituted for D, Fig. 1.

The gas is liquefied and volatilized in chamber H, freezing whatever is contained in chamber G.

When the heating of the recipient A is stopped a partial or relative vacuum is formed in the space between the absorbent and the liquefied gas, assisting in the volatilization of the latter. This volatilization will then be greatly facilitated, if care is taken to keep the recipient A surrounded with cool water, in order to extract the heat produced by the absorption.

Having thus described my invention, what is claimed as new, and desired to secure by Letters Patent, is—

1. The process of practically producing ice and cold by driving off a volatile gas from a solution or absorbent containing it into a closed chamber, where it is condensed by means of its own pressure and elasticity, assisted by the extraction of its heat, again volatilizing it to obtain cold, and returning it to the absorbent which has been properly cooled, substantially as described.

2. In a process for the practical production of ice and cold, promoting the evaporation of a liquefied gas by means of an absorbent or substance having a chemical affinity for the gas evaporated, instead of an exhausting-pump.

FERDINAND PHILIPPE EDOUARD CARRÉ.
JEAN BAPTISTE JAVA MIGNON.
HENRI STANISLAS ROUART.

Witnesses as to signature of F. P. E. CARRÉ:
F. OLCOTT,
M. J. BUJAC.

Witnesses as to signatures of J. B. J. MIGNON and H. S. ROUART:
E. AUBERT,
L. LE BOULLEUD DE COURLAY.